455-612　　　AU 263　　　EX
12/1/87　　　XR　4,710,977

United States Patent [19]
Lemelson

[11] Patent Number: 4,710,977
[45] Date of Patent: * Dec. 1, 1987

[54] COMMUNICATION SYSTEM AND METHOD

[76] Inventor: Jerome H. Lemelson, 85 Rector St., Metuchen, N.J. 08840

[*] Notice: The portion of the term of this patent subsequent to Feb. 28, 2001 has been disclaimed.

[21] Appl. No.: 583,670

[22] Filed: Feb. 27, 1984

Related U.S. Application Data

[62] Division of Ser. No. 885,268, Mar. 10, 1978, Pat. No. 4,434,510.

[51] Int. Cl.⁴ .............................................. H04B 9/00
[52] U.S. Cl. ................................... 455/603; 455/607; 455/612
[58] Field of Search ............... 455/603, 606, 607, 608, 455/612, 617, 68, 70, 343, 605; 340/310 R, 310 A; 343/6.5 R, 6.5 SS, 6.8 R; 342/50

[56] References Cited

U.S. PATENT DOCUMENTS

| | | | |
|---|---|---|---|
| 3,253,588 | 5/1966 | Vuilleumier et al. | 342/50 |
| 3,964,020 | 6/1976 | Dickerson | 455/612 |
| 3,989,942 | 11/1976 | Waddoups | 455/605 |
| 4,091,734 | 5/1978 | Redmond et al. | 455/608 |
| 4,107,518 | 8/1978 | McMahon | 455/601 |
| 4,183,054 | 1/1980 | Patisaul et al. | 455/612 |
| 4,434,510 | 2/1984 | Lemelson | 455/617 |

OTHER PUBLICATIONS

Unterberger—"Application of Optical Comm."—2nd Euro. Conf. on Optical Fiber Comm., 1976, Communication X11.3, pp. 383-387, Sep. 1976.
Crump—"Powering Transistorized Electronic Devices"—Publish. Office of Tech. Services, 12/13/1957, pp. 1-17.
Hollmann—"Designing Free Power"—Electronic Industries & Tele. Tech., Sep. 1956, pp. 54-56, 92-95.

Primary Examiner—Joseph A. Orsino, Jr.

[57] ABSTRACT

A system and a method of communicating information between remote locations are provided wherein either or both the functions of interrogation of the communicating equipment at the remote locations and the generation of electrical energy thereat for powering the comunication equipment is effected by the transmission of a beam of radiation to the remote locations from either a receiving station for the information or an auxiliary source of radiation. In one form, the receiving station for information or an auxiliary station generates beam radiation at fixed time intervals and predeterminately directs pulses of the beam radiation along different predetermined paths whereby the radiation is directed to receiving devices at a plurality of different remote locations and serves to either initiate a transducing function at each location such as the measurement of a process variable, the electro-optical or electro-magnetic scanning of a particular area of said remote location for security purposes, the reading of a recording device containing previously recorded information at each remote location or other variables. The beamed radiation received by each remote location may also be converted by a radiant-electrical energy cell thereat to electrical energy which may be immediately used to power a transmitter and energize a transducer thereat and/or to charge a battery at the remote location for energizing such a transmitter and one or more transducers so as to effect the transmission of information by short wave or modulated light beam means to either a central receiving station for such information or a relay station therefore. The relay station may be similarly energized by energy received from a remotely generated beam means such as a laser or may be the source of beam energy for the remote receiving locations.

10 Claims, 2 Drawing Figures

COMMUNICATION SYSTEM AND METHOD

RELATED APPLICATIONS

A division of Ser. No. 885,268 filed Mar. 10, 1978 now U.S. Pat. No. 4,434,510.

SUMMARY OF THE INVENTION

This invention relates to a system for communicating information between remote locations wherein the communication function and, in certain instances, the function of providing energy for powering the devices at the remote locations, is effected by a radiant energy beam generating means such as a laser which is automatically controlled in its operation wherein the direction of the laser beam is also automatically controlled so as to service and control the generation of information at a plurality of different locations in the system. In one form of the invention, one or more lasers are employed at a central location wherein each laser is automatically controlled to generate pulses of intense light energy of the same or different durations and to direct the pulses so generated to different remote receiving devices located remote from each other at out stations or fixed locations relative to the central location from which the beam energy is generated. Beam transmission and communication is effected either by direct transmission through the atmosphere, the transmission thereof along light pipes or a combination of both.

Conventional communication systems suffer a number of shortcomings which the system and method defined in the instant invention overcome. Most communication systems associated with instrumentation involved in process control, the remote detection of objects such as in security systems, or the transmission of data recorded over a period of time from remote locations to a data logging station, require the use of electrical cables or wires and furthermore require at least one source of electrical energy at each location for powering one or more measuring devices and transmitting means. Where system control is effected remotely, wire transmission of control signals is generally required. Such operational requirements are not only complex in nature but are costly to install and maintain. The systems of the prior art also require either a local source of electrical energy to operate the local transducer and transmitter or a power distribution system for conducting electrical energy to each of the remote measuring stations to effectively operate same.

Accordingly, it is a primary object of this invention to provide a new and improved system and method for communicating.

Another object is to provide a communication system employing one or more radiation beams for the remote control of information transmission.

Another object is to provide a communication system and method employing beamed radiation generated remote from an information transmitting station for powering transmission apparatus at said station.

Another object is to provide a communication system and method employing one or more radiation beams for transmitting energy to a remote location for powering one or more devices at said remote location including a device for generating information by scanning or other means.

Another object is to provide a communication system and method of communicating information from a plurality of remote locations without the need for providing a source of electrical energy at each of the locations or wire conducting means extending thereto for supplying electrical operating energy.

Another object is to provide a communication system associated with a security system which communication system may be easily set up at minimum cost.

Another object is to provide an apparatus and method for setting up a communication system employing beamed light energy as a means for communicating between components of the system and for supplying operational energy therefore wherein the system components are disposed at different locations, each of which locations may not be precisely known prior to the disposition of the components.

Another object is to provide a communication system which provides for two-way communication between a central station and one or more outway stations wherein the outway stations are both controlled and powered by radiant energy directed thereto from the central station.

Another object is to provide a communication system which is particularly applicable for the transmission and logging or processing of data generated by a plurality of sensors situated at different locations in the process, without the need for wire or cable communication means between the sensors and the data logging or collection stations.

Another object is to provide an automatic control system for controlling the operation of a variety of different types of electrically operated devices and controls which are remote from a control station without the need for laying or extending wires between the control station and the electrical devices or providing radio communication means requiring a source of electrical energy at each of the locations of the electrical devices.

Another object is to provide an automatic communication system for communicating both control signals and power in the form of pulses of radiant energy to one or more locations which are remote from the source of the energy and which contain means for converting the radiant energy to electrical energy for operating one or more devices at each remote location.

Another object is to provide a communication system wherein one or more servo devices, such as motors or solenoids, are remotely controlled and operated by energy which is transmitted to the vicinity of each device in the form of beamed radiant energy and which is converted to electrical energy at the location of each device, thereby eliminating the need for a local source of electrical energy for powering each device.

Another object is to provide an automatic, remote control system for machines and the like wherein at least one control component for controlling the operation of each machine is both supplied with energy necessary to operate same from a remote location and controllable from such remote location.

Another object is to provide an instrumentation system employing a plurality of measuring instruments disposed at different locations remote from a central monitoring station wherein the monitoring station contains radiation beam generating means which may be controllably operated to automatically activate and energize any of the instruments located remote therefrom, without the need for wires connected between the instruments and the monitor station.

Another object is to provide a two-way communication system in which radiant energy is directed as a beam from a first location to a second location and is utilized to power a radiant energy beam generating means at the second location for completing or extending the communication length.

Another object is to provide a measuring system in which a beam of radiant energy is generated at a first location and transmitted to a second location where it is converted to electrical energy which is employed to power an electrically operated device at the second location and wherein the same or an auxiliary beam of radiant energy is modulated with information which is received and employed at the second location to control one or more devices operated by the electrical energy converted from the received beam energy.

Another object is to provide an instrumentation and monitoring system employing a plurality of sensors and/or instruments located remote from each other and communicating with a monitor station wherein conducting wires are completely eliminated for supplying electrical energy for the sensors and for communicating purposes.

Another object is to provide a monitoring or instrumentation system employing a plurality of sensors provided at different locations wherein at least certain of the sensors are powered by associated batteries wherein each of the batteries is kept charged for power operating the sensors by the intermittent transmission of beamed radiant energy to each location where it is converted to electrical energy employed to charge the battery.

Another object is to provide a security system employing a plurality of sensors for sensing variations in environments in the vicinities of different locations to be monitored wherein wires are completely eliminated and communication with a monitor station is automatic.

Another object is to provide a computer controlled sensing and monitoring system which may be rapidly set up and which does not require the connection of wires to remote locations thereof at which variables are monitored.

Another object is to provide a sensing system including at least one sensor and a monitor means remote from the sensor for receiving information generated by the sensor wherein the sensor is operated by a battery which is charged by solar energy and may also be charged by a convertor adapted to receive beamed radiant energy from a remote location such that, when solar energy is not received thereat, the battery may be maintained at a given level.

Another object is to provide an apparatus and method for remotely operating and controlling a laser by means of beamed radiant energy directed to the vicinity of the laser and a receiver therefore which either directly utilizes the beamed radiant energy to cause the laser to operate or converts same to another form.

With the above and such objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed without departing from the nature and spirit of the invention.

Figure 1:
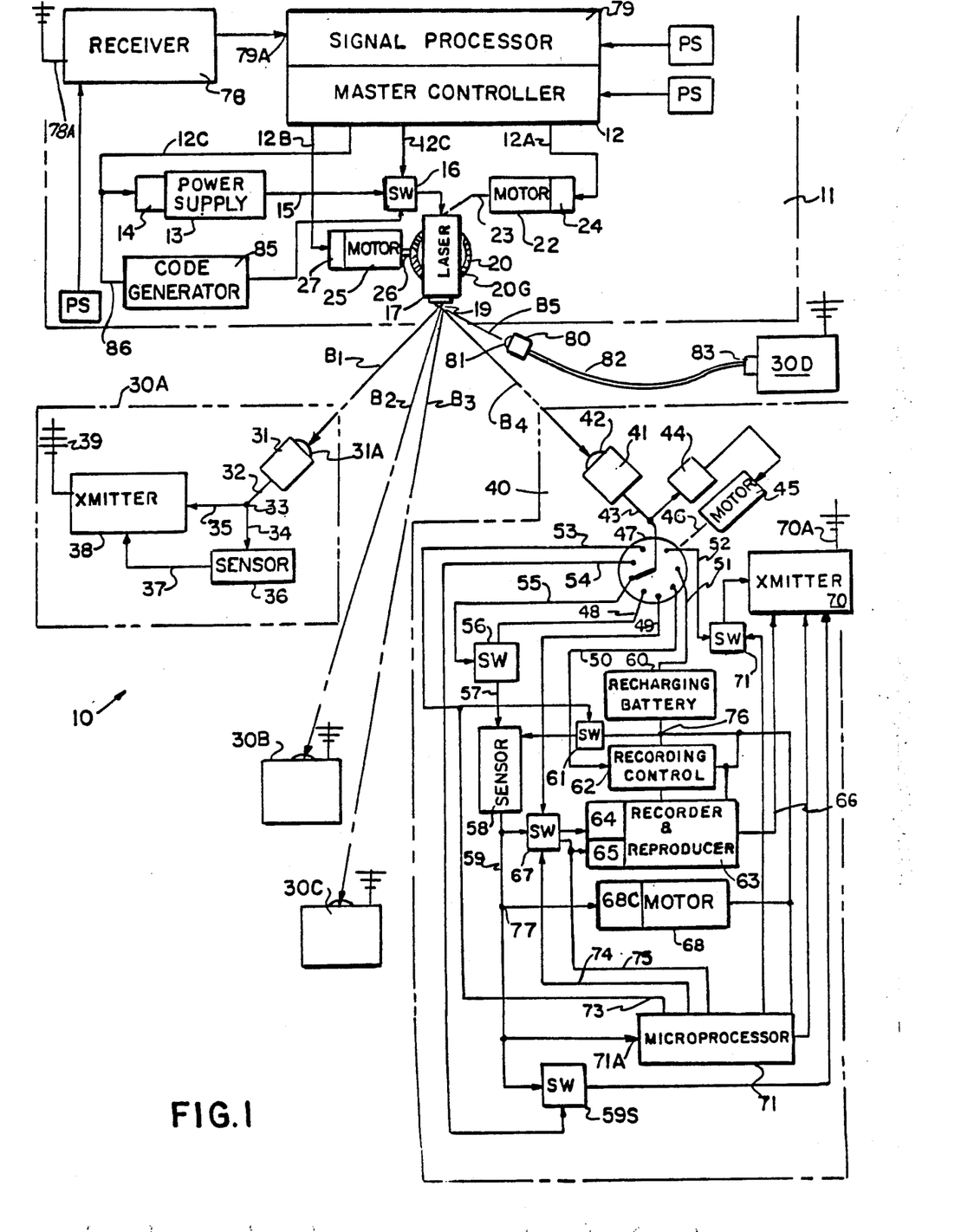
FIG. 1 is a schematic diagram illustrating a communication and monitoring system employing light radiation for communicating with and powering a plurality of remote devices.

In FIG. 1 is shown a first form of the invention defining a system 10 for communicating both information and operating energy between a central control or master station 11 and a plurality of out-stations denoted 30A, 30B, 30C and 40, which out-stations are remote from each other and the central station 11 by distances which may vary from relatively short distances measured in feet or hundreds of feet to thousands of feet and possibly even miles apart.

The system 10 may be employed to communicate various types of information between the central or master station 11 and the out-stations such as instrumentation information relating to a manufacturing or chemical process, security information such as information derived by detecting the presence of one or more objects moving into the areas scanned by the out stations or other type of information.

The master control station 11 comprises a master controller 12 which may vary from a simple multi-circuit timer having a plurality of output control circuits denoted 12A, 12B, 12C, etc. to a more complex signal processor such as a digital or analog computer which is operable to receive information from a memory or from the process itself and to generate command control signals on the outputs thereof. The outputs of the master controller 12 of FIG. 1 extend respectively to power or control inputs of respective motors 22 and 25 which operate to predeterminately deflection control the housing of a laser 17 in respectively pivoting same about two axes, and the control input 14 for a power supply 13 which supplies electrical energy to energize the laser 17 and cause it to generate a beam of intense coherent radiation on its output 19. By predeterminately controlling the attitude of the laser 17 or a directional lense or mirror which receives the output beam of the laser, the beam may be directed from the station 11 to one or more of a plurality of receivors for said beam energy, one or more of which may be located at each of the out stations.

In FIG. 1, out-station 30A is shown as having a receiving device 31, preferably in the form of a photoelectric detector such as a so called solar energy cell having an input 31A and an output 32 for electrical energy which the light energy of the beam B1 received by said input is converted within the cell 31 to such output energy.

Connected to the output 32 of cell 31 is a junction or control device 33 such as a transformer which transmits electrical energy therefrom over two circuits. A first circuit 34 extends to the energizing input of a sensor 36 while a second circuit 35 extends to the energizing input of a transmitter 38 such as a short wave transmitter having an antenna 39 for transmitting shortwave signals to a receivor 78 at the master control station 11. The sensor 36 may be any type of electrically energized transducer or sensor which is operable to sense a particular condition in the vicinity thereof such as changes in the optical characteristics of the field scanned by the sensor, variations in such physical phenomena as magnetic radiation, light radiation, electrical capacitance, heat, pressure or force transmitted thereto. The output 37 of the sensor 36 is thus an electrical signal which is modulated in accordance with the variations of the physical phenomenon sensed by the sensor and may be either transmitted, after being amplified in transmitter 38, as an analog signal to the receivor 78 which passes same to a signal processor 79 for processing at the master control station 11 or may be converted to one or more digital signals either in the sensor 36, an analog to digital converter connected thereto or in the transmitter 38, which digital signals are transmitted to the receiver 78 from which they are transmitted to the signal processor 79 at the central station for automatically processing or recording same.

It is noted that the output 32 of the cell or photodetector 31 may extend to a plurality of sensors, each of which is operable to sense a different variable or the same type of variable at different locations in the vicinity of the out station 30 and to generate respective signals which are representative of the variables sensed or scanned, which signals are transmitted of a transmitter 38 to the receivor 78 of the central station.

In a more complex form of the invention illustrated in FIG. 1, an out station 40 is shown containing a photoelectric detector or solar-type cell 41 having an input 42 and an output 43 for electrical energy generated by the cell when it receives beamed radiation (denoted B4) from the laser 17. The output 43 is connected to the input of a multiple pole switch 47 such as a rotary stepping switch which is driven to switch its input to the various outputs thereof by means of a motor 45, such as a stepping motor or pulse operated motor which is energized each time a coded relay 44 is activated by a particular code or frequency signal generated on the output of detector 41.

The outputs 48-55 of the switch 47 are connected to various devices including a chargable battery 60, a control 62 for a recorder of information generated at the station 40, a sensor 58 or a plurality of sensors of the type described, a detection circuit or circuits 68 which will be described and various control switches for performing either or both the functions of closing and opening said switches to effect different types of automatic control of the apparatus at the out station 40.

If it is desired to recharge the battery 60 to permit it to power the various electrically operated devices at the outstation 40 after the battery has run down or expended most of its energy, the motors 24 and 25 are automatically controlled, either by means of signals generated by the master controller 12 or a manually operated control means therefor to deflection control the housing of the laser 17 so that the scanning axis of the laser will intersect the input 42 to the light energy-to-electrical energy convertor or solar cell 41. By properly controlling the laser 17 thereafter to generate pulses of light energy in the form of a code or coded beam which is directed at the input 42, a similar code in the form of electrical signals will be generated on the output 43 of the convertor or solar cell 41 which will be transmitted to the coded relay 44 which will respond to such coded electrical signals and either pass electrical energy thereafter directly from the output 43 through a switch forming part of the relay to the energizing input of the rotary switch operating motor 45 or, in another embodiment which is not shown, pass electrical energy from the output of battery 60 to operate motor 45 for a sufficient period of time to step the rotary switch 47 connecting the input line 43 to the output circuit 51 extending to the recharging battery 60. Thus electrical energy generated on the output 43 of the cell or convertor 41 is gated through the switch 47 to the recharging input of the battery 60 and if the connected circuit is retained for a predetermined period of time while electrical energy is generated as converted from the beam of laser energy directed to the cell 41, the battery may be fully recharged. Such recharging function may be effected, for example, during periods of time when it is not necessary to automatically control the various electrically operated devices connected to the various outputs of the rotary switch 47.

If it is desired to energize the sensor 58 at a particular time to obtain information sensed thereby, the rotary switch 47 is controlled in its operation by coded signals generated on the output 43 of the photoelectric detector 41 which signals may be either applied to properly control a coded switch or a rotary switch 47 by the predetermined control of the switch operating motor 41 as described to cause the input to the switch to be connected to output 55 thereof for first closing a bi-stable or flip-flop switch 56 whereafter the rotary switch 47 is controllably operated to connect the input 43 to the output 48 permitting electrical energy generated thereafter by means of the solar cell or convertor 41 to be passed to the sensor 58 for energizing same. The output 59 of sensor 58 is operatively connected to a short wave transmitter 70 through a switch 59S which is a bi-stable switch or flip-flop operated by signals generated on another output 53 of the rotary switch 47 and, when closed by said signals, connects the output 59 of the sensor 58 to the input of the short wave transmitter 70.

The output 59 of sensor 58 is also shown as being directly connected to a microprocessor or computer 71 located at station 40 for processing the signals generated on the output 59 of sensor 58 by digitizing or otherwise performing functions thereon to either provide such signals in a better form to transmit to the receiver 78 of the master station 11 or to automatcally determine if the quantitative value of such signals is such as to require short wave transmission from the antenna 78 of the short wave transmitter 70.

The output of the rechargeable battery 60 is shown connected to a junction 76, the outputs of which extend to the energizing or power inputs of the sensor 58 or a plurality of such sensors, a recording and reproduction unit 63 such as a magnetic tape recorder and automatic recording control 62 therefor and a motor or a plurality of motors designated 68, the function or functions of which will be described. If the device 76 is merely a junction between the battery 60 and the various electrically energized devices 58, 62, 63, 68, etc., then further switching controls in each of said devices are operable upon receipt thereby of respective signals on the outputs of the rotary switch 47 to connect the power input lines from the battery 60 to respective electrically energized and operated devices thereof. The junction 76 may also contain a multiple pole switch which may be either or both remotely controlled by signals generated on the output 43 of the cell 41 and/or signals generated on one or more of the outputs of the microprocessor 71 in accordance with the signals received thereby from the one or more sensors 58 sensing variable conditions as they may exist at the out station 40.

When sensor 58 generates a signal on its output 59 as it senses a particular process or ambient condition at the out station 40, such signal may be transmitted to the input 71A of the microprocessor 71 for processing and eventual control of devices located at the out-station and/or transmission of information back to the master station 11 but the signals generated on output 59 may be applied to operate one or more controls such as a control 68C for operating motor 68 and may also be passed to a recording input 64 of the recorder and reproduction unit 63 to permit it to be directly recorded on a record member thereof. A bi-stable switch 67 provided in a branch output of the sensor 58 may be closed by a signal generated by cell 41 in response to light received from the laser 17 and/or by a signal generated on the output 74 of the microprocessor 71 if the latter automatically determines that the output of the sensor 58 is of such a nature as to require its direct recording in the recorder and reproduction unit 63. Another output 75 extends from the microprocessor to a control 65 of the recorder and reproduction unit 63 which, when energized by a signal generated on output 75, causes the recorder and reproduction unit 63 to automatically reproduce the recordings thereof and transmit same on an output 66 to the short wave transmitter 70 to be transmitted to the receiver 78 of the master or monitor station 11. The output 74 of the microprocessor 71 may also have signals, such as digital signals indicative of the signal generated by sensor 58, transmitted thereon through switch 67 to the recording input 64 of the recording unit 63. The switch 67 may also be operable in response to a control signal generated on the output 49 of the rotary switch 47 for energizing the reproduction control input 65 of said recorder and reproduction unit 63 to cause it to generate signals reproduced from its record member on its output 66 for the transmission thereof by short wave through transmitter 70 to the receiver 78 of the monitor or master station 11.

Notation 61 refers to a bi-stable switch located in the circuit between the output of the battery 60 and the energizing input of the sensor 58 which switch may be operable to close upon receipt of a signal generated on an output 53 of the rotary switch 47 so that the sensor 58 may be energized in response to a command signal transmitted from the laser 17 to the receiver 42 of the cell 41. It is noted that the sensor 58 may also be energized by signal generated on an output (not shown) of the microprocessor 71 if the latter automatically determines that additional operation of the sensor 58 is necessary or desirable to obtain additional information therefrom.

The motor 68 may comprise a solenoid or motor for operating a mechanism such as a valve or other device located at the station 40 for performing a particular function with respect to material or process variable thereat. It may also comprise a series of motors or solenoids which are simultaneously operated by signals generated either by one or more sensors at the station 40, or on the output or outputs of the microprocessor 71 or the light-to-electric energy cell 41 in response to beamed energy received thereby from the master or monitor station 11.

In an alternate form of the invention, the single controlled multiple output switch 47 may be replaced by a multiple output junction having an input from the cell 41 whereupon each of the controlled switches, sensors and devices of station 40 would be controlled by the energization of respective coded relays, each responsive to a different code which is transmitted on all of the outputs of the junction.

Also illustrated in FIG. 1 is a fiber-optical link between the master station 11 and an out-station denoted 30D. When the laser 17 is predeterminately directed by the predetermined operation of the deflection motors 22 and 25 as described, such that the axis of its beamed energy B5 is directed at an input 81 to a coupling device 80 for one end of a flexible optical transmission cable 82 containing one or more so-called light pipes, the light energy will be transmitted along one or more of the optical fibers of the light pipe to a remote location at the other end of the cable which contains a coupling device 83 for coupling the light energy received from the cable to a cell similar to light-to-electrical energy conversion cell 41, for performing functions of the types described above such as recharging a rechargeable battery, effecting the closure and/or opening of one or more switches, directly energizing one or more sensors, motors, solenoids, or process control devices and energizing a short wave transmitter, the antenna of which if illustrated as protruding from the block denoted 30D. The signals generated on the short wave antenna of the out station 30D are transmitted by short wave to the antenna 78A of the receiver 78 which generates signal on its output representative of the received information and passes same to the input 79A of the signal processor 79. The signal processor 79 may include one or more alarm devices for alerting an operator at the master station 11 of a particular condition or conditions requiring observation and/or corrective action. Manually controlled means such as one or more switches or a keyboard may therefore be provided at the master station 11 for controlling the deflection and operation of the laser 17 to generate or transmit light energy as coded pulses along an axis or axes directed at one or more of the inputs to the out stations 30A, 30B, 30C, 30D, etc., to either effect one or more corrective actions or control functions for predeterminately controlling motors, sensors, recorders or other devices at the out stations requiring such actions. Accordingly, the signal processor 79 may be operatively connected to a master control and display panel or a terminal containing a visual display, such as a cathode ray tube for displaying information received by receiver 78.

The signal processor 79 may also be operatively connected to a computer, such as the master controller 12, for controlling or programming same to generate predetermined signals on the outputs 12A-12D thereof for controlling the deflection and operation of the laser 17 so as to permit to to predeterminately control devices at one or more of the remotely located out stations 30A-30D.

While the output beam energy of the laser 17 may be coded by intermittently operating a gate or mirror adapted to receive the beam energy and to interrupt or reflect such energy to an absorber so as to provided pulses of beam energy along the different axes to the inputs of the different out stations, in FIG. 1 the power supply 13 may have its energizing input interrupted or pulsed by means of a control 14 such as a normally open switch which is intermittently closed to gate input energy to the power supply 13 from line current in accordance with signals transmitted thereto either on an output 12D of the master controller or computer 12 in accordance with specific control requirements or on an output 86 of a code signal generator 85 which may be a card reader, the output of a recorder, or a manually operated keyboard for generating a series code on the output 86 for intermittently controlling the laser 17 for generating pulses of light energy on its output in the form of desired codes for effecting the described automatic control functions at the remote out station.

Notations 24 and 27 refer respectively to control inputs for the motors 22 and 25 which are activated by particular code or pulse signals generated on the outputs 12A and 12B of the master controller for predeterminately controlling the operation of said motors to predeterminately deflection control the housing for the laser 17 in two directions to cause the scanning axis of the laser to be directed at selected of the inputs to the out stations. Notations 23 and 26 refer to the output shafts of the motors 22 and 25 which are respectively connected to gear or other means for predeterminately deflection controlling the laser housing in vertical and horizontal directions for the purpose described. The output 15 of the power supply 13 is connected through a normally open switch 16 to the input of the laser 17. Such normally open switch 16 is closed by the signal generated on an output 12C of the master controller or generated by the code generator 85 when it is desired to predeterminately energize the laser 17.

In yet another form of the instant invention, it is noted that the optical cable 82 may be operable to transmit both light energy for powering one or more devices located at the remote out station 30D and coded light energy for activating selected coded relays or switches as described but also may contain means for transmitting coded information in the form of pulses or amplitude modulated light energy as generated by one or more lasers at the way station 30D, the outputs of which are optically coupled to the coupling device 83. Such laser or lasers may be modulated, for example, by signals generated on an output or outputs of a microprocessor such as 71, a recording and reproduction unit such as 63 or one or more sensors such as sensor 58 as illustrated within the block denoted 40. In such an embodiment, the coupling device 80 at the master station 11 would contain coupling means connected to either additional optical transmission cables or coupled to one or more photoelectric detectors for detecting the amplitude modulated or pulsed light energy transmitted along the cable 82 from the out-station 30D and for generating output electrical signals which may be transmitted therefrom directly to the input 79A of the signal processor 79 for processing as described. In such an arrangement, the need to transmit short wave code signals to the receiver 78 is eliminated and one or more or all of the out-stations 30 may be so optically linked for two-way communication with the master station 11 as described.

In still another form of the invention, a single laser or a plurality of lasers may be intermittently operated to transmit light energy along a plurality of light pipes such as optical fibers or bundles of fibers forming flexible cables thereof which cables are constructed to permit pulsed light transmission in two directions therealong, one from the laser and one from the output of a second laser or other light source which is modulated with information generated by a sensor or sensors sensing process or machine operating variables as described. Such a communication system would include at least one laser; a plurality of optical coupling means for receiving laser light therefrom and directing same to respective light pipes; respective light-to-electrical energy generating converters such as solar cells or solar type cells the outputs of which are connected to power respective sensors; signal processors as described for the signals generated by the sensors and respective lasers or light sources and modulating means for modulating the outputs of said light sources in accordance with the variations in the signals generated by the sensors; further coupling means between the light sources and a second optical fiber or fiber bundle extending along the same cable to a location at or near the other end of the cable and a further coupling means for passing the received light to a photoelectric detector or photoelectric cell which is operable to generate electrical signals on its output which are representative of the signals generated on the output of the sensor ay the other end of the cable. The outputs of the respective photocells which receive light energy from each remote sensor location in the system are connected to a signal processor or computer for processing and/or recording all remotely generated information and, in certain instances where it is desired to control a process rather than just monitor, for generating control signals for controlling one or more remote motors, solenoids or other devices operable to effect such process control automatically.

The significance of such a control and communication system employing two way transmission of information or feedback information transmission and feed forward energy transmission along the same light cable as is fed the feedback information in the form of modulated light, is that batteries are not needed at each of the remote sensing locations. Such a system may be utilized to sense variations in the operation of a machine or vehicle such as a boat, airplane, spacecraft or motor vehicle or in the operation of a machine such as a machine tool or other production machine, or a vehicle. For example, sensors located on the wings and other flight surfaces and within the structures of an aircraft may be used to sense such variables as stress, fluid flow, flutter, vibration, temperature, acceleration, velocity, deflection or strain deformation, relative movement of components including driven flight surfaces, the operation of motors and other devices such as solenoids which operate during the flight or operation of the aircraft. The sensors are energized to permit them to sense such variables when they receive light energy from light-to-electrical energy generating cells such as so- called solar cells which are located adjacent the sensors and which receive energizing light energy from a remote location as directed therefrom along one or more light pipes as described. The output of the sensor when so energized, is applied to moodulate a light source such as another laser or lamp the light energy of which is retransmitted along different fibers of the same cable along which the energizing light is transmitted. Such light pipes or cable may be cemented or otherwise secured to the skin and internal structure of the aircraft body, wing or other flight surface. A similar type of sensing and communication system may be employed to sense variables associated with operating a motor vehicle or boat; an engine or a machine wherein electrical wires are eliminated and a single source of electrical energy is provided remote from each sensor.

If a machine or vehicle contains rotating components between which it is desired to communicate operating and/or energizing light energy as described, such transmission may be effected across a spatial gap between coupling devices by modulating pulsed light energy generated when the coupling devices are aligned during their relative rotation and demodulating or converting the received light energy to electrical energy by means of a photoelectric cell connected to the receiving coupling device.

Figure 2:
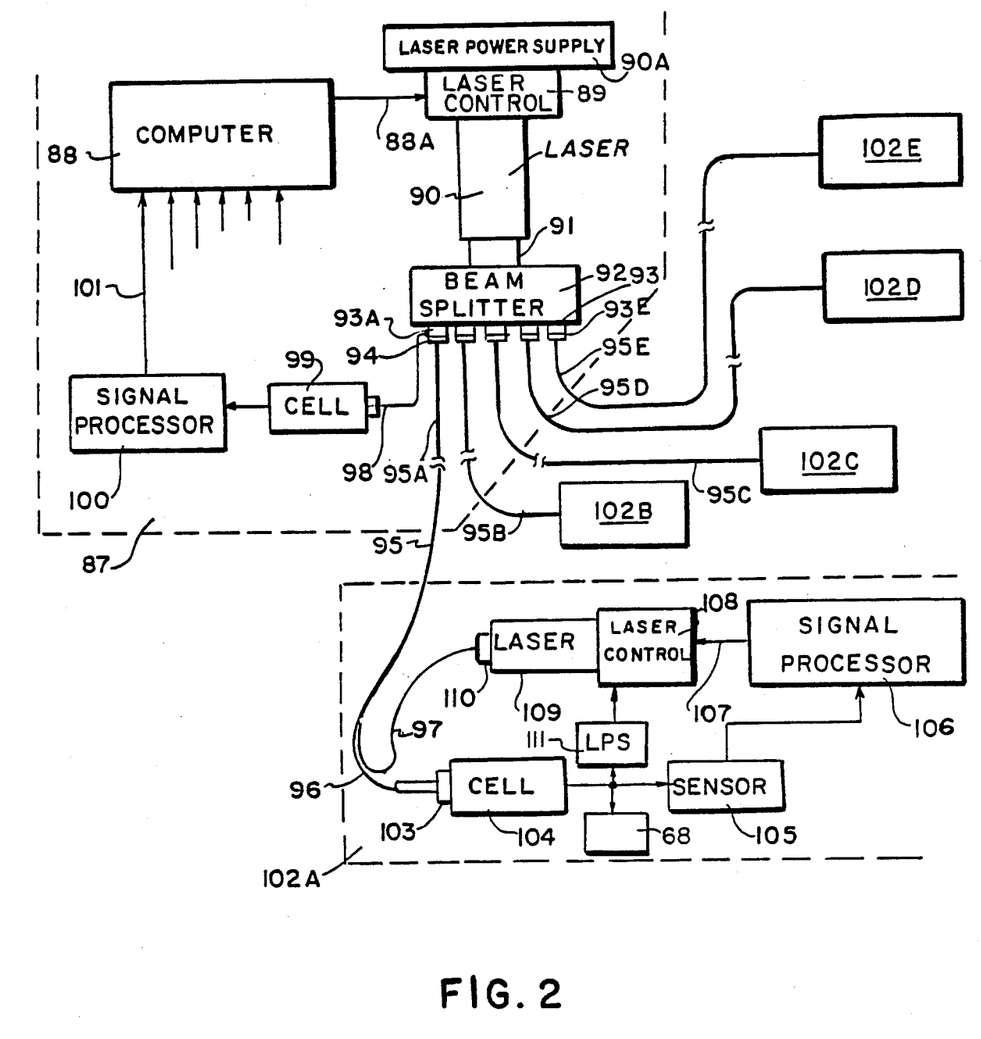
FIG. 2 is a schematic diagram of another form of the invention.

In FIG. 2 is shown a modified form of the invention in which light energy is employed for effecting two-way communication between a monitor station 87 and a plurality of remotely located receiving or out-stations denoted 102A, 102B, 102C, 102D, 102E, etc., Unlike the system illustrated in FIG. 1, two-way communication and control is effected without the need for the short wave transmission of information signals from the out-stations to the master or monitor station, by employing separate light pipes or light pipe bundles extending from the master station to each of the out-stations to effect such two-way communication and control. The master station 87 contains a computer 88, such as a digital computer, having an output 88A which is connected to a laser control unit 89 for controlling the operation of a laser 90 in accordance with signals generated by the computer 88 by either controlling one or more gates disposed between a power supply 90A for the laser energy and the input to the laser or by variably controlling an output gate 91, such as a Kerr cell, deflectable mirror or prism capable of modulating the output of the laser in accordance with signals generated by the computer 88. The laser output 91 is connected to an optical beam splitter 92 having a single input therefrom and a plurality of outputs 93, each of which includes a coupling means for coupling laser beam energy presented thereto by the beam splitter 92 to a light guide or optical fiber bundle forming part of an optical cable 95, wherein each of the cables extending from the respective outputs 93A–93E of the beam splitter 92 extend to respective of the out-stations or remote sensing locations denoted 102A–102E.

Sensing location or out-station 102A is shown in detail and it is assumed that the other sensing locations contain similar components or a modified form of the circuits and components illustrated as contained at the station 102A. The light pipe or fiber bundle 96 is shown as terminating at an input coupling 103 to a light-to-electrical energy conversion cell 104, such as a so called solar cell which is operable for converting the light energy transmitted on the light guide or pipe 96 from the laser 90. The output of cell 104 may extend to one or more of the devices illustrated in FIG. 1 as forming part of the out-station 40. In FIG. 2, the output of the cell 104 is illustrated as being connected to an electric motor 68 for powering same to open or close a valve or perform any other suitable function at the out-station 102A and also to a sensor 105 and a power supply 111 for a laser, the function of which will be described. Sensor 105 may be utilized, for example, to sense a process variable such as temperature, pressure, fluid flow, stress, strain or other variable and to generate a signal, when energized by electrical energy from the cell 104, on an output which extends to a signal processor 106 which may digitize the analog signal output of sensor 105 or perform other operations thereon for determining the degree of variation of the variable sensed by the sensor 105.

The output 107 of signal processor 106 extends to a control device 108 for a laser or light source 109 and is employed to variably control or modulate the output light generated by the laser in accordance with the information sensed by the sensor 105. Connected to the output of the laser 109 through a coupling device 110 is the light guide or light pipe 97 which extends through the cable 95 alongside the light pipe or guide 96, back to an optical coupling device denoted 94 which couples the end of the light pipe or guide 97 to a branch light pipe or guide 98 extending to a light-to-electrical energy conversion cell 99, such as a solar cell, the output of which is an electrical signal or signals representative of the information transmitted on light pipe 97 to the master station 87. The electrical signal output of cell 99 may passed to a signal processor 100 having an output 101 extending to an input to the computer 88 or may be passed directly to said computer which may store, display or further process the information represented by the electrical signals it receives from the various out-stations 102A–102E and may utilize same after processing for predeterminately controlling the laser 90 as described and effecting further remote sensing of process variables or remote control of one or more motors, solenoids or otherwise operated devices as described in FIG. 1.

Although not illustrated in FIG. 2, each of the other outputs 93 of the beam splitter 92 may be similarly constructed with coupling devices similar to 94 for transmitting light energy received from the lasers or modulated light sources at each of the out-stations 102, either to the cell 99 or to respective similar cells having outputs connected to the computer 88 as illustrated for processing the information generated by the one or more sensors at each of the out-stations or sensing locations.

The system illustrated in FIG. 2 has various applications such as those described above, for controlling chemical processes, power generating processes, a variety of machines such as machine tools, powered vehicles such as aircraft, trains, motor vehicles and boats; production machinery such as machine tools and most any machine, vehicle or system subject to variations in temperature, pressure, stress, strain, deflection of elements, accelerations and velocity which directly or indirectly affect their operation or which may become excessive resulting in the system's failure or damage, if the operation thereof is not monitored and properly controlled.

It is also noted that certain of the other features illustrated in FIG. 1, such as the recharging battery 60, the recorder 63, one or more motors or solenoids 68 and devices operated thereby, one or more microprocessors for processing information generated at the out-stations or remote sensing locations, may be incorporated in the embodiment illustrated in FIG. 2 together with the means of FIG. 1 for controlling such devices if located at the out-stations of FIG. 2, from the master control or monitor station 87. Such control may be effected by suitably modulating the laser 90 through the control 89 by means of signals generated by the computer 88 or modulating respective outputs of the beam splitter 92 for generating respective commands on the output cables 96 extending to each of the out-stations 102. In other words, the light energy generated by the laser 90 may be modulated or coded and transmitted simultaneously on each of the output light pipes forming part of the cables 95A–95E for the simultaneous similar control of devices at each of the out-stations 102A–102E or the beam splitter 92 may be so constructed to permit the output of the laser 90 to be transmitted to selected of the outputs of the beam splitter wherein respective trains of light pulses in different code combinations may be transmitted to respective of the out-stations for effecting particular control functions at each of said out-stations.

I claim:

1. A communication system comprising in combination:
   a computer including a central processing unit for processing information,
   first means controlled by said computer for generating radiation, second means controlled by said computer for modulating the radiation generated by said first means with control information, a plurality of control locations remote from said first means, means for selectively transmitting the radiation generated by said first means to selected of said plurality of control locations, third means at each of said control locations for receiving radiation generated by said first means and directed thereto, fourth means at each of said control locations for converting a first portion of the received radiation from said first means to operating electrical energy and a second portion of such received radiation to control electrical signals defined by the control information with which said radiation is modulated, an electrically operated device at each of said control locations and fifth means for applying and said operating electrical energy received to operate said electrical device, sixth means for controlling the operation of the electrically operated device of each control location, seventh means for applying said control electrical signals to said sixth means to cause said sixth means to control the operation of said electrical device, eighth means at each of said control locations for generating feedback signals indicative of the operation of said electrical device, nineth means including short wave signal transmitting means at each control location for receiving signals generated by said eighth means and short wave transmitting same, tenth means for short wave receiving signals transmitted by said ninth means and converting said signals to electrical signals, and eleventh means connected to receive said latter electrical signals, perform computations thereon and control the operation of said first and second means.

2. A system in accordance with claim 1 wherein said eleventh means includes said computer.

3. A system in accordance with claim 1 wherein said first means includes means for generating laser light energy and means for selectively directing at least a portion of the light energy so generated to selected of said plurality of control locations.

4. A system in accordance with claim 3 wherein said means for generating said laser light energy comprises a single laser, means for deflection controlling the beam generated by said laser, said computer being operable to generate deflection control signals and means for applying said deflection control signals to the deflection control means for said laser to cause the laser beam generated under the control of said computer to be selectively directed at selected of said control locations in accordance with the operation of said computer with respect to the feedback signals generated by the eight means at each of said control locations.

5. A method of remotely operating and controlling an electrical device comprising:

generating a beam of light radiation with a laser and modulating said beam with information by controllably operating said laser at a first location, directing said modulated light beam from said first location along a select path to a second location, receiving radiant energy of said beam with a photoelectric cell at said second location and transducing at least a portion of the received radiation by means of said photoelectric cell to operating electrical energy, detecting the information contained in said beam and generating such information as variable electrical signals, applying said variable electrical signals to control said electrical device at said second location, operating said electrical device with electrical energy transduced from the radiant energy transmitted from said first location to said second location, and transducing a portion of the energy of the laser generated radiation beam received at said second location to power-electrical energy and applying said power-electrical energy to charge an electric battery and employing said battery to provide electrical energy to operate said electrical device under the control effected by said information electrical signals.

6. A method in accordance with claim 5 including computer controlling the operation of said laser to generate said beam of radiation and to modulate said beam with said information.

7. A method in accordance with claim 5 including generating said beam of radiant energy by operating said laser in a manner to cause said laser to generate light energy of sufficient intensity to operate said electrical device and transmitting the output of said laser along a light pipe to said second location.

8. A method in accordance with claim 7 wherein said electrical device is a sensor for sensing a variable at said second location, said method further including recording information sensed by said sensor at said second location by operating an electrically energized recording means with electrical energy derived from the energy transduced from the beam energy received at said second location.

9. A communication system comprising:

a central data station including a first laser having an output for generating a beam of coherent monochromatic radiant light energy, means for modulating the beam of light energy output by said first laser with information, a length of first fiber-optical cable along which light may be conducted, said first fiber-optical cable having an input end and an output end, means for coupling the output of said first laser to the input end of said first fiber-optical cable to permit light generated by said first laser to be received by and transmitted along said first fiber-optical cable to said output end thereof, a rceiving station including means for supporting the output end of said first fiber-optical cable, first transducing means at said receiving station for converting light to electrical energy, means for coupling said first transducing means to said output end of said first fiber-optical cable to permit light transmitted along said first fiber-optical cable to be operatively received by said first transducing and to be converted thereby to electrical signals which vary in accordance with variations in the light energy output by said first laser, second transducing means at said receiving station for receiving and converting at least a portion of the electrical energy generated by said first transducing means to light energy, a length of second fiber-optical cable having an input end at said receiving station and an output end, means for coupling the output of said second transducing means to the input end of said second fiber-optical cable to permit light generated by said second transducing means to be transmitted along said second fiber-optical cable, third means at the output end of said second fiber-optical cable for receiving light energy generated by said second transducing means and transducing same to further electrical signals, and fourth means connected to receive and record said further electrical signals.

10. A method for effecting control and communication functions comprising:

generating first radiation in the form of a beam of collimated monochromatic laser light at a first location, directing said first laser light beam along a select path to a second location, receiving said first radiation at said second location and transducing at least a portion of the received light radiation to electrical energy, applying at least part of the electrical energy generated at said second location to a sensor to electrically operate said sensor for sensing a variable which varies in accordance with variations in the variable sensed by said sensor and generates variable output electrical signals, employing the signals output by said sensor to control the operation of a laser at said second location to cause said laser to generate radiation which is modulated with information defined by the output of said sensor, transmitting the radiation generated by said laser at said second location to a photolectric cell located remote from said sensor and generating information electrical signals on the output of said photoelectric cell modulated with the information generated by said sensor, and recording said information electrical signals in a recording means for later analysis.

* * * * *